April 14, 1970   B. CORNELISON ET AL   3,505,873

MATERIAL FLOW GRAVITY METER

Filed Oct. 28, 1966

INVENTORS:
BOYD CORNELISON
EDWIN G. MILLIS
FREDERICK E. ROMBERG

ATTORNEY

United States Patent Office 3,505,873
Patented Apr. 14, 1970

3,505,873
MATERIAL FLOW GRAVITY METER
Boyd Cornelison, Edwin G. Millis, and Frederick E. Romberg, Dallas, Tex., assignors to Texas Instruments Incorporated, Dallas, Tex., a corporation of Delaware
Filed Oct. 28, 1966, Ser. No. 590,258
Int. Cl. G01v 7/00
U.S. Cl. 73—382
7 Claims

ABSTRACT OF THE DISCLOSURE

The disclosure is directed to a gravity measuring system including a vessel with upper and lower storage chambers communicating at an orifice and having a return channel coupling the lower chamber to the upper chamber. Fluid granular material is disposed in the upper chamber, with a stopper preventing the flow of the granular material through the orifice. Control structure is provided to actuate the stopper to abruptly open the orifice to initiate flow of the granular material to the lower chamber. The time interval required for all of the granular material to flow through the orifice is measured to provide a direct-indication of the ambient gravity of the gravity meter.

---

This invention relates to a gravity measuring system and more particularly to a rugged accurate fluid flow system which is responsive to changes in the force of gravity.

Prior gravity measuring devices are many and fall in general into three categories. The first is of the pendulum type which measures the total gravity vector. The second is of the spring-mass type which also measures the total gravity vector. The third is the torsion balance type which generally is employed to measure the horizontal gradient of gravity. Such prior art devices have two common problems. They are fragile and they are sensitive to temperature. The present invention is based upon the principle of a sand-clock. Although it has several hundred thousand moving parts, when constructed in accordance with the present invention, it is neither fragile nor temperature sensitive.

The rate of flow of sand or other material through a constriction varies with gravity. The present invention is directed to the provision of a sensitive system of the foregoing type which would provide repeatable results and which is capable of measuring gravity or changes in gravity with a high degree of repeatability.

More particularly, in accordance with the invention, there is provided a closed container having two chambers interconnected by a flow orifice. Means are provided for abruptly opening the orifice for flow from an upper chamber to a lower chamber and for sensing termination of the flow. Means are also provided which are connected to the initiating and sensing means for measuring the time interval therebetween. The container and the fluid material therein are formed of material having the same thermal coefficient of expansion such that changes in temperature will proportionately change both the material and the flow orifice.

For a more complete understanding of the present invention and for further objects and advantages thereof, reference may now be had to the following description taken in conjunction with the accompanying drawings in which.

Figure 1:
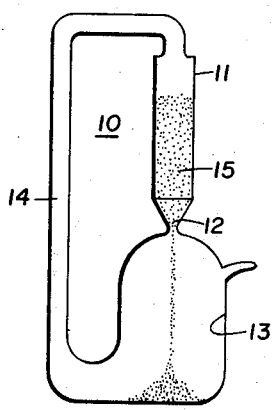
FIGURE 1 illustrates one embodiment of a sand-clock construction in accordance with the present invention.

In FIGURE 1, a gravity meter 10 comprises an upper storage chamber 11 whose side walls slope to an orifice 12. The orifice 12 leads to a collector chamber 13. The bottom of chamber 13 is coupled to the top of chamber 11 by way of a tube 14. The upper chamber 11 is filled with a fluid material 15, of granular or liquid character. The flow of such material 15 through orifice 12 is a function of gravity. In accordance with the present invention, the unit 10 and its associated parts are provided such that the system is substantially insensitive to temperature and pressure and such that the initiation and termination of flow through the orifice 12 may be accurately measured.

Figure 2:
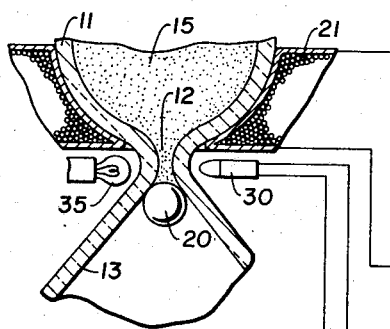
FIGURE 2 illustrates a starting system and sensing system.

In FIGURE 2, the lower end of the chamber 11 and the upper end of the chamber 13 are shown in section. In the form illustrated, a magnetic sphere 20 is employed as a closure member for the orifice 12. The sphere 20 is maintained in position by a magnetic field produced by energization of a coil 21 which surrounds the lower end of the chamber 11 adjacent to the orifice 12. The coil 21 is energized by current flow from a battery 22 by way of a single-pole, double-throw switch 23. So long as the coil 21 is energized, the sphere 20 will block flow of granular material 15 through orifice 12. As switch 23 is opened, current flow through coil 21 terminates and the ball 20 drops to the bottom of container 13. The flow of the granular material 15 thus is initiated.

In the system of FIGURE 2, when switch 23 is operated, the voltage from battery 22 then passes through a normally closed switch 26 and is applied to the input of a timer recorder 24.

The termination of flow is sensed by a photocell 30. Photocell 30 is connected to a relay coil 31, through an amplifier 33 and powered by a battery 34. The photocell 30 is positioned adjacent to the orifice 12 and is adapted to be illuminated by light from a source 35. However, so long as the granular material 15 is flowing through the orifice, the light reaching the photocell 30 is relatively low in intensity. However, abruptly upon termination of flow, the resistance of the photocell is abruptly reduced by increased illumination. The amplified current flow from battery 32 then increases to a level such that the relay coil 31 will open switch 26. Thus, there is provided an accurate and reliable measure of the time interval between the initiation of flow of material 15 and the termination thereof.

Since the accuracy of any such device can be no better than the accuracy of the starting of the flow and in determining the end of flow, a precision electrical system will be employed for initiating the start and determining the end of flow.

Although a number of materials may be used for the body of the system 10, FIGURE 1, and for the granular material, it is preferred that fused quartz be employed for forming the chambers 11 and 13, the orifice 12, and the return tube 14. Further, the material 15 preferably is in the form of hollow quartz spheres. Such material, even at room humidity, flows like water, there being no tendency to clump. Suitably spheres for use in this system are of the type sometimes used for insulation purposes. When such material is used, then any change in the diameter of the orifice due to temperature will be counteracted by the same percentage change in the size of the particles.

The flow time can be made to repeat to about 10 milliseconds for a one hour time interval. The running time-gravity function has been found to be approximately linear over a significant range. This provides a gravity resolution of about 3 milligals on the earth.

It is to be understood that measurements of even a 3 milligal accuracy would be satisfactory for gravity measurements in connection with lunar and planetary hard-landing vehicles where surviving the landing is more important than extreme accuracy. Further, the device would be useful for measuring gravity from an unstable platform. The device basically integrates the gravity over a long period and would thus average out short time fluctuations of such a platform.

The granular material may be of the type manufactured and sold by Monsanto Chemical Company and identified as Santocel which comprises very small quartz spheres, available in various sizes, solution of which would depend upon the size of the orifice and the desired measuring inteval.

Figure 3:
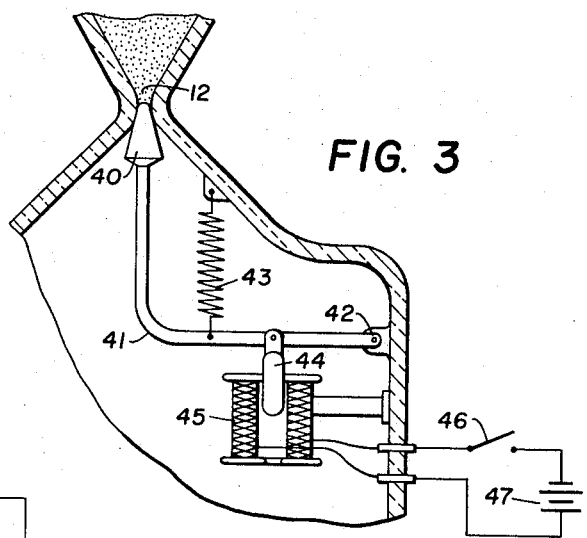
FIGURE 3 illustrates a starting system.

FIGURE 3 illustrates an alternative form of starting system wherein a plunger 40 is pivoted from a pivot point 42. A spring 43 normally biases the plunger 40 into the orifice 12 to prevent flow therethrough. An armature 44 is coupled to the arm 41 and cooperates with a solenoid coil 45. The coil 45 is coupled by way of switch 46 to a battery 47. Upon closure of switch 46, the magnetic field thus produced pulls the armature 44 down, thus opening the orifice 12. This starting system may then be employed in the place of the starting system of FIGURE 2. The voltage across the coil 45 may be used to initiate the timer-recorder as in FIGURE 2.

Figure 4:
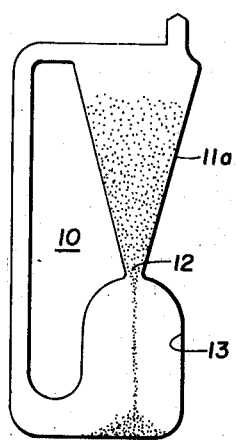
FIGURE 4 illustrates another form of the flow system.

FIGURE 4 illustrates an alternative form of the unit 10 wherein an elongated smooth-walled cone 11a forms the upper storage chamber with the orifice 12 leading to the lower storage chamber 13. The flow pattern and forces present at the orifice may thus be made more uniform than in the system of FIGURE 1.

Thus, in accordance with the present invention, there is provided a rigid vessel having upper and lower storage chambers with the side walls of the upper chamber tapering to a bottom orifice. A fluid material is provided in the upper chamber having the same coefficient of thermal expansion as the container. A stopper is provided for the orifice and means are provided to actuate the stopper means to open the orifice abruptly to initiate flow of the material through the orifice. A timer is responsive to the control means and the initiation of flow through the orifice and to passage of the last of the material through the orifice to measure the time required for all of the material to flow through the orifice.

Having described the invention in connection with certain specific embodiments thereof, it is to be understood that further modifications may now suggest themselves to those skilled in the art and it is intended to cover such modifications as fall within the scope of the appended claims.

What is claimed is:
1. A gravity meter which comprises:
    (a) a vessel having a storage chamber whose side walls lead to a bottom orifice,
    (b) fluid material in said chamber, said material having substantially the same coefficient of thermal expansion as said chamber,
    (c) stopper means for said orifice,
    (d) control means to actuate said stopper means to open said orifice abruptly to initiate flow of said material through said orifice, and
    (e) timer means responsive to said control means upon initiation of flow through said orifice and to passage of the last of said material through said orifice to measure the time interval required for all said material to flow through said orifice to provide an indication of the ambient gravity.
2. The combination set forth in claim 1 wherein said vessel is made fo fused quartz and said material is formed of quartz spheres.
3. The combination set forth in claim 1 wherein said vessel is an evacuated vessel.
4. The combination set forth in claim 1 wherein said timer means includes a photocell responsive to cessation of material flow through said orifice to mark the end of said time interval.
5. A gravity meter which comprises:
    (a) a vessel having a storage chamber whose side walls lead to a bottom orifice,
    (b) fluid material in said chamber, said material having substantially the same coefficient of thermal expansion as said chamber,
    (c) a magnetizable stopper member located below said orifice,
    (d) control means including magnetic field generating means adjacent said orifice of said vessel to actuate said stopper means to open said orifice abruptly to initiate flow of said material through said orifice, and
    (e) timer means responsive to said control means upon initiation of flow through said orifice and to passage of the last of said material through said orifice to measure the time interval required for all said material to flow through said orfice to provide an indication of the ambient gravity.
6. The combination set forth in claim 5 wherein said orifice is conical at the lower end thereof and wherein said stopper member is a sphere.
7. A gravity meter which comprises:
    (a) a vessel having a lower storage chamber and an upper storage chamber whose side walls lead to an orifice structure leading to said lower chamber and with a return channel coupling said lower chamber to the top of said upper chamber,
    (b) fluid material in said vessel, said material having substantially the same coefficient of thermal expansion as said chambers,
    (c) stopper means for said orifice,
    (d) control means to actuate said stopper means to open said orifice abruptly to initiate flow of said material through said orifice, and
    (e) timer means responsive to said control means upon initiation of flow through said orifice and to passage of the last of said material through said orifice to measure the time interval required for all said material to flow through said orifice to provide an indication of the ambient gravity.

References Cited
UNITED STATES PATENTS

| 3,266,294 | 8/1966 | Geres | 73—35 |
| 3,376,753 | 4/1968 | Pitkin et al. | 73—432 |

CHARLES A. RUEHL, Primary Examiner

J. R. FLANAGAN, Assistant Examiner

U.S. Cl. X.R.

58—144